United States Patent [19]
McCalmont

[11] Patent Number: 6,135,682
[45] Date of Patent: Oct. 24, 2000

[54] MULTI-SPINDLE PHASE CONTROLLED MACHINING

[75] Inventor: Paul E. McCalmont, Cincinnati, Ohio

[73] Assignee: Unova IP Corporation, Woodland Hills, Calif.

[21] Appl. No.: 09/483,374

[22] Filed: Jan. 14, 2000

[51] Int. Cl.[7] .......................... B23Q 15/08; B23Q 15/14
[52] U.S. Cl. ........................................ 409/131; 409/141
[58] Field of Search .................... 409/203, 213, 409/217, 141, 131; 82/903; 700/280; 408/143

[56] References Cited

U.S. PATENT DOCUMENTS

| | | | |
|---|---|---|---|
| 1,723,999 | 8/1929 | Bernard | 409/203 |
| 2,483,535 | 10/1949 | Gallimore | 409/203 |
| 3,744,353 | 7/1973 | Rohs | 82/2 R |
| 3,823,644 | 7/1974 | Mello . | |
| 3,945,694 | 3/1976 | Vaillette . | |
| 3,946,298 | 3/1976 | van de Loo . | |
| 4,047,469 | 9/1977 | Sakata | 408/143 |
| 4,261,675 | 4/1981 | Zankl | 409/141 |
| 4,535,527 | 8/1985 | Fischer et al. | 409/217 |
| 4,611,934 | 9/1986 | Piotrowski et al. . | |
| 4,640,158 | 2/1987 | Link et al. . | |
| 5,037,252 | 8/1991 | Hasegawa et al. . | |
| 5,115,546 | 5/1992 | Mitsukuchi et al. . | |
| 5,117,544 | 6/1992 | Kousaku et al. . | |
| 5,193,953 | 3/1993 | Jesinger . | |
| 5,221,185 | 6/1993 | Pla et al. | 416/34 |
| 5,390,545 | 2/1995 | Doan | 73/650 |
| 5,417,132 | 5/1995 | Cox et al. . | |
| 5,713,253 | 2/1998 | Date et al. | 409/131 |
| 5,784,273 | 7/1998 | Madhavan . | |
| 5,876,155 | 3/1999 | Link et al. | 409/141 |
| 5,920,974 | 7/1999 | Bullen . | |

OTHER PUBLICATIONS

Products, "Productive Bed–Type and Rail–Type Machines Matched to Your Production Needs", Wide Range Profiler, http://www.cinmach.com/products/profiler_wide.htm, 1 page, Oct. 27, 1999.

Cincinnati Milacron, "Rail–Type 3– and 5–Axis Gantry CNC Vertical Profiling Machines", Publication No. SP–161, 14 pages, 1989 Cincinnati Milacron Marketing Company.

Primary Examiner—William Briggs
Assistant Examiner—Erica Ergenbright
Attorney, Agent, or Firm—Steven J. Rosen

[57] ABSTRACT

A multiple-spindle machine includes a support and a number of spindles rotatably mounted to the support. Each of the spindles is operably connected and in driving relationship to a respective one of a like number of cutters, each of the cutters having two or more cutting edges. Each spindle is operably connected to an individually controllable electric motor. A controlling device controls the speed of each electric motor and the angular position of its associated spindle. A phase control device adjusts the speed and the angular position of each of the spindles such that the cutting edges of each of the cutters are out of phase with each of the cutting edges of others of the cutters during operation of the multiple-spindle machine. Angular position and speed detecting devices are used for detecting angular positions and speeds of each of the spindles. The angular position and speed detecting devices are in signal transmitting relationship with the phase control device. In a preferred embodiment of the invention, the phase control device is programmed to adjust speed of the spindles such that cutting edge angular positions are out of phase by an amount equal to 360 degrees divided by product of the number of the spindles and the number of cutting edges of each of the cutters.

11 Claims, 11 Drawing Sheets

MULTI-SPINDLE PHASE CONTROLLED MACHINING

BACKGROUND OF THE INVENTION

1. Field of the Invention

This invention relates to multi-spindle CNC machine tools and, more particularly, to such a machine and machining with simultaneous synchronized cutting of all the spindles.

2. Discussion of the Background Art

Very large multi-spindle machine tools, e.g. profilers used in the aircraft industry, have large translatable gantries supporting multiple spindle carriers. Each of the carriers contains an electric motor to power the spindle and a cutting tool mounted to an end of the spindle. One such a machine is known as a rail-type five-axis gantry CNC vertical profiling machine, commercially manufactured by Cincinnati Machine, assignee of this invention, (formerly by Cincinnati Milacron, Inc). This type of machine is used to sculpt very long workpieces with the cutting tools held in three or more spindle carriers moving under command of a computer control. The spindle carriers are supported for vertical movement on a slide which, in turn, moves transversely with respect to the bed on the ways of a movable bridge or gantry slide. The gantry slide moves horizontally along the length of the bed on parallel rails mounted to the floor. A typical bed length being in the magnitude of forty to fifty feet, and the motorized spindle head, which drives multiple spindles and cutting tools, traverses the full length of the bed.

Generally, multi-spindle machines do not have spindle speed control interaction between spindles. Slight variation in speed from one spindle to the next results in a processing of the cutting teeth relative to each other. This results in a variation in phasing of the teeth and thus an adding of forces and torques and subtracting of forces and torques with respect to time. The forces and torques are reacted from the cutters, back through the spindles, the spindle carriers, and the gantry. The variation can result in poor finish and when forces combine at maximum they may induce chatter or excessive deflection. The cyclic nature of the variation causes vibrations that results in increased wear and a more rapid onset of a misalignment condition of the machine. The maximum amount of additive forces and torques occurs when all of the cutting edges engage workpieces simultaneously.

SUMMARY OF THE INVENTION

A multiple-spindle machine includes a support and a number of spindles rotatably mounted to the support. Each of the spindles is operably connected and in driving relationship to a respective one of a like number of cutters and each of the cutters has two or more cutting edges. Each of the spindles is operably connected to a respective one of a like number of individually controllable electric motors for rotatably driving each of the spindles respectively. A control means controls the speed of each electric motor and the angular position of its associated spindle and a phase control means for adjusting the speed and the angular position of each of the spindles such that the cutting edges of each of the cutters are out of phase with each of the cutting edges of others of the cutters during operation of the multiple-spindle machine. A more particular embodiment of the invention includes angular position detecting means for detecting angular positions of each of the spindles and angular speed detecting means for detecting angular speed of each of the spindles. The angular position detecting means and the angular speed detecting means are in signal transmitting relationship with the phase control means. In a preferred embodiment of the invention, the phase control means is programmed to adjust speed of the spindles such that cutting edge angular positions are out of phase by an amount equal to 360 degrees divided by product of the number of the spindles and the number of cutting edges of each of the cutters.

A more particular embodiment of the invention includes a number of spindle carriers wherein each of the spindles and the motors are carried on one of each of the spindle carriers. A vertically translatable slide supports the spindle carriers and the vertically translatable slide is mounted on a horizontally translatable gantry. In one further embodiment of the invention, the spindles are horizontal 4-axis spindles while in another embodiment the spindles are vertical 5-axis spindles.

The present invention includes a method of operating a multiple-spindle machine having a support, a number of spindles rotatably mounted to the support, each of the spindles is operably connected and in driving relationship to a respective one of a like number of cutters, and each of the cutters having two or more cutting edges. Each of the spindles is operably controlled by a respective one of a like number of individually controllable electric motors which rotatably drive each of the spindles respectively. A control means controls the speed of each electric motor and the angular position of its associated spindle and a phase control means adjusts the speed of each of the spindles such that the cutting edges of each of the cutters are out of phase with each of the cutting edges of others of the cutters. A more particular embodiment of the invention includes using angular position detecting means for detecting angular positions of each of the spindles and using angular speed detecting means for detecting angular speed of each of the spindles. The angular position detecting means and the angular speed detecting means are used to transmit signals to the phase control means and the phase control means uses the signals to adjust the speed of each of the spindles such that cutting edge angular positions of the cutters are out of phase with those of the other cutters. In a preferred embodiment of the invention, the phase control adjusts speed of the spindles such that cutting edge angular positions are out of phase by an amount equal to 360 degrees divided by product of the number of the spindles and the number of cutting edges of each of the cutters.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
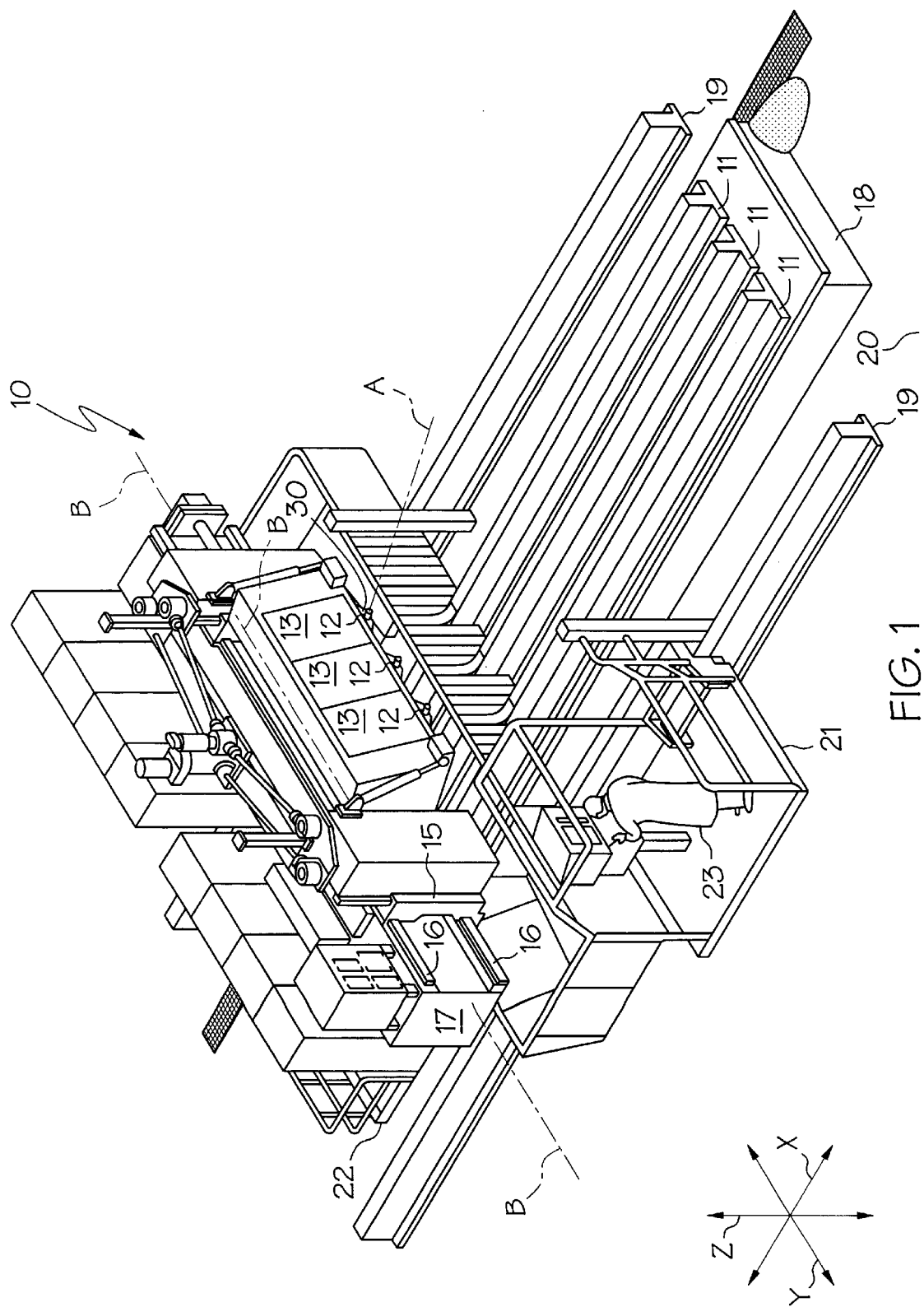
FIG. 1 is a perspective view illustration of a machine tool having a long bed, a gantry movable along a length of the bed, and spindle carriers on a support mounted on the gantry.
Figure 2:
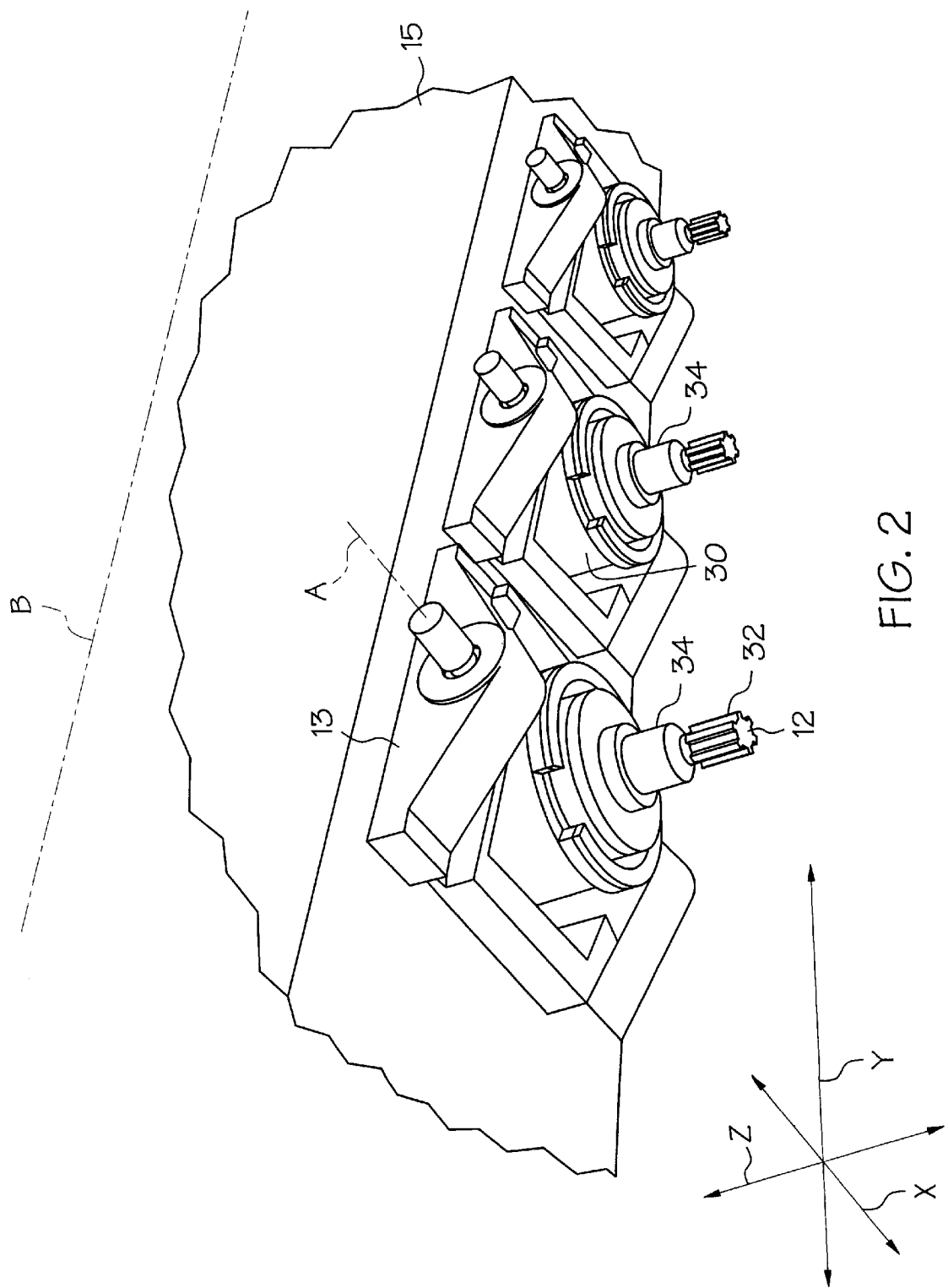
FIG. 2 is an enlarged perspective view illustration of spindle carriers supported a slide 15 of the machine tool in FIG. 1.

Illustrated in FIGS. 1 and 2 is a very large CNC machine 10 typically used in the aircraft industry. This machine 10 is known as a rail-type five-axis gantry CNC vertical profiling machine, commercially manufactured by Cincinnati Machine (formerly by Cincinnati Milacron, Inc.), assignee of this invention. The machine 10 is used to sculpt very long workpieces 11 with cutters 12 held in three spindles 30 (shown more particularly in FIG. 2) mounted on spindle carriers 13 moving under command of a computer control 14. The spindle carriers 13 are supported for vertical movement on a support which in the exemplary embodiment is a slide 15. The slide 15 moves transversely of the bed on the ways 16 of a movable bridge or gantry 17 to which it is rotatably mounted. The gantry 17 moves horizontally along the length of the bed 18 on parallel rails 19 mounted to the floor 20. The gantry 17 on this particular type of machine 10 is quite large and includes forward and aft platforms 21 and 22, respectively, at the front and aft ends of the gantry for supporting an operator 23 and other service personnel (not shown). For all practical purposes, the machine bed 18, rails 19, and floor 20 may be considered as a common base, since they are relatively stationary with respect to one another.

As illustrated in FIG. 2, the spindle 30 includes a tool holder 34 adapted for receiving and retaining various cutting tools such as the cutters 12. Relative positioning between work piece and each of the spindle 30 is done along 3 linear motion axes X, Y, and Z and about two rotational axes, slide trunnion axis B about which the slide 15 pivots in a X and Z axes plane, and spindle trunnion axis A about which each of the spindles 30 pivot and which is perpendicular to trunnion axis B. The gantry 17 moves horizontally along the length of the bed 18 which extends along the X axis and the slide 15 moves vertically in a direction parallel to the Z axis. The spindle carriers 13 translate in a direction parallel to the Y axis as well as being capable to pivot about the trunnion axis B. Each of the spindles 30 operably connected and in driving relationship to a respective one of a like number of the cutters 12 and each of the cutters having two or more cutting edges or teeth 32. The exemplary embodiment illustrated herein has 3 each of the spindles 30 and spindle carriers 13 and has 6 of the cutter teeth 32 on each of the cutters 12 as illustrated more particularly in FIG. 4.

Figure 3:
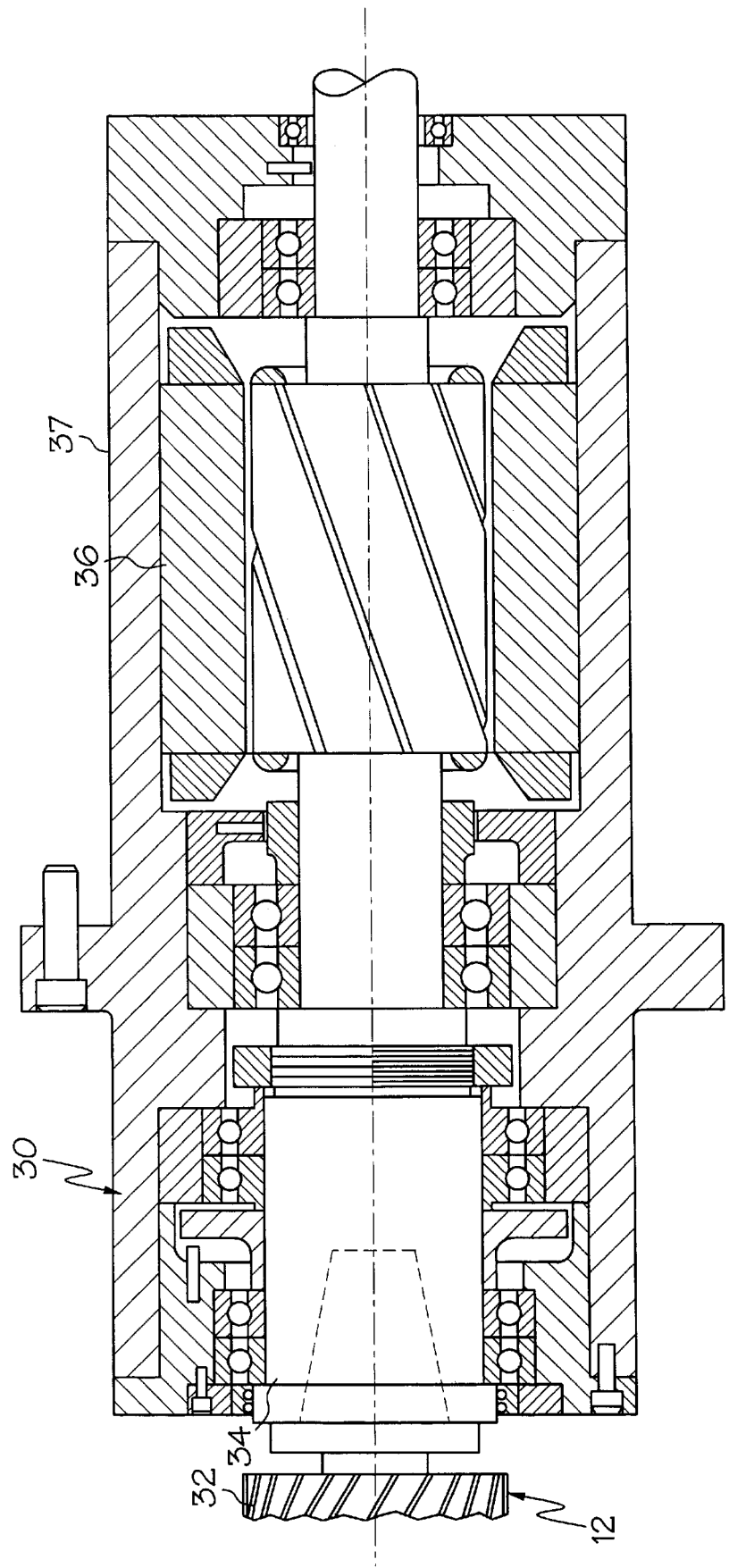
FIG. 3 is a cross-sectional view illustration of a spindle cartridge containing a spindle and an electric motor mounted on one of the carriers in FIGS. 1 and 2.
Figure 4:
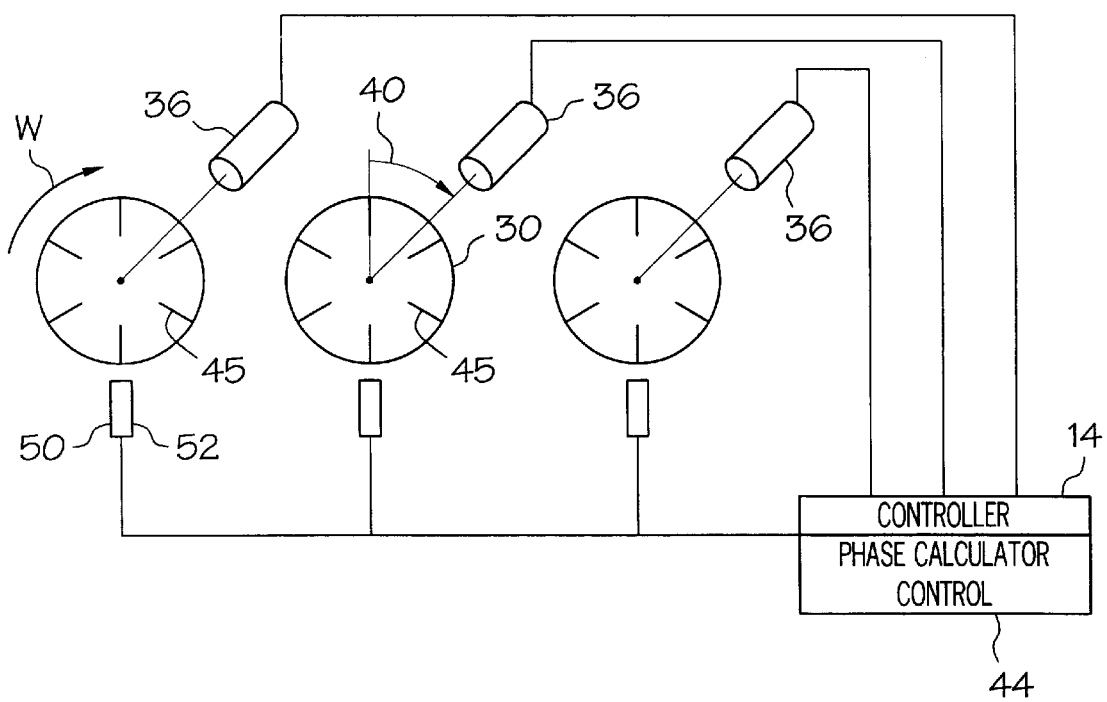
FIG. 4 is a schematic illustration of the speed control and phasing control of the present invention for spindles of the machine tool in FIG. 1.

Referring briefly to FIG. 4, each of the spindles 30 is operably connected to a respective one of a like number (3) of individually controllable electric motors 36 for rotatably driving each of the spindles respectively. FIG. 3 illustrates the spindle 30 and the electric motor 36 mounted in a spindle cartridge 37 which in turn is mounted on spindle carrier 13 in FIGS. 1 and 2. Referring to FIG. 4, a control means, such as the control 14 controls the angular speed W of each electric motor 36 and the angular position 40 (i.e. in degrees) of its associated spindle 30. A phase control means 44 is used to adjust the angular speed W and the angular position 40 of each of the spindles 30 such that the cutting teeth 32, as indicated by respective spindle angular locations 45 of the teeth, of each of the cutters 12 are out of phase with each of the cutting edges of the other cutters during operation of the multiple-spindle machine 10.

Figure 5:
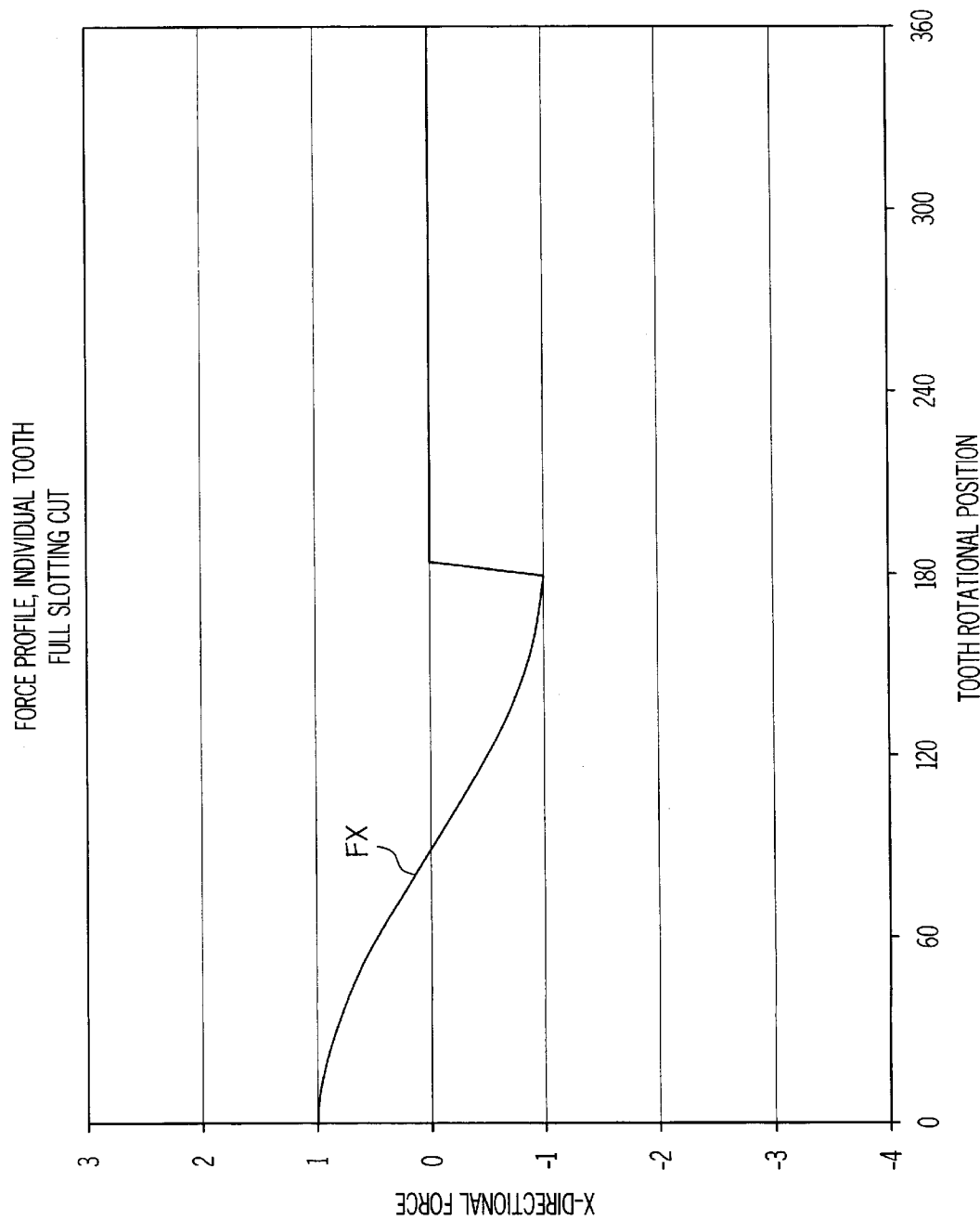
FIG. 5 is a graphical illustration of a reaction force FX in the X-direction of a single tooth on a cutter on one of the spindles of the machine tool in FIG. 1.
Figure 6:
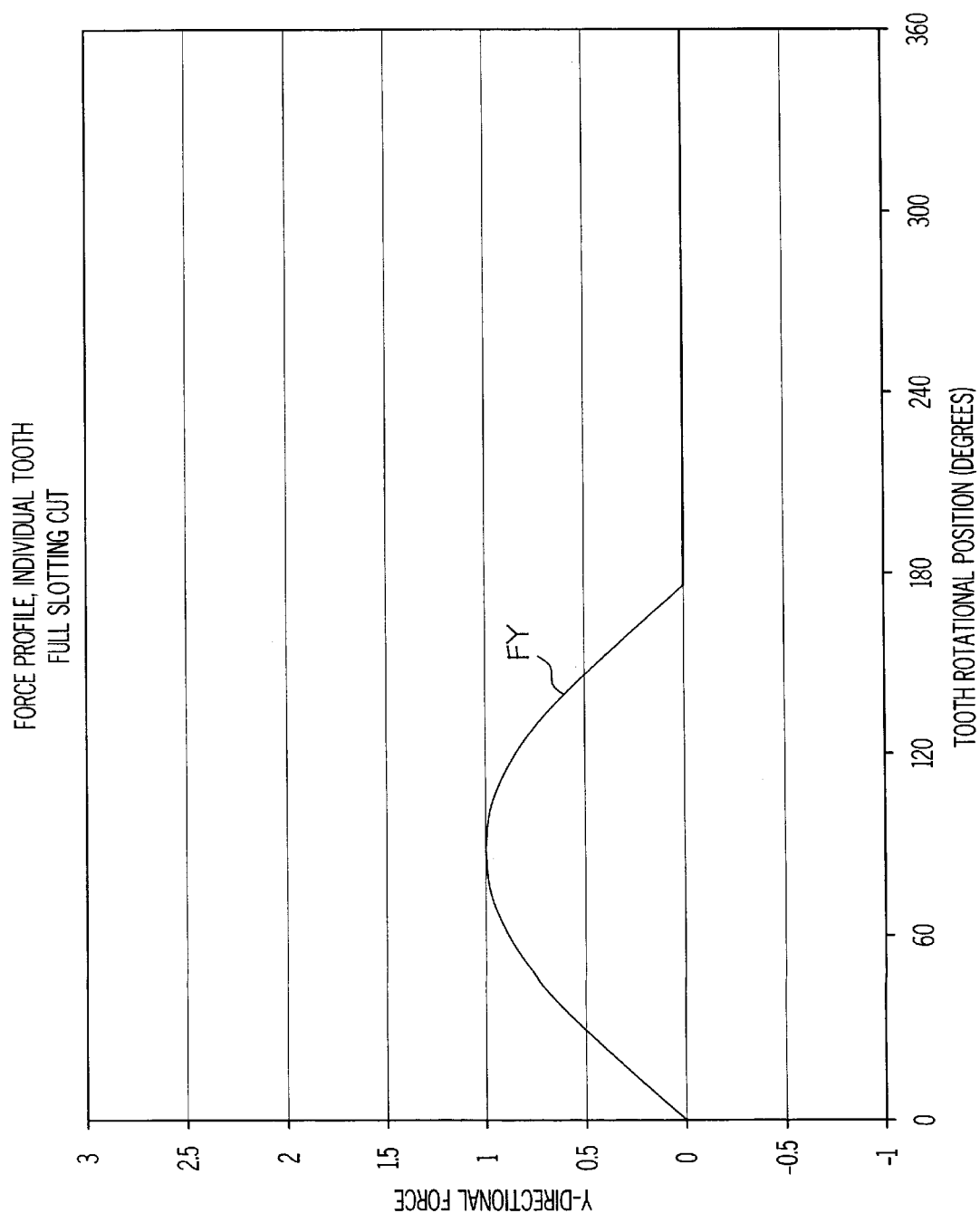
FIG. 6 is a graphical illustration of a reaction force in the Y-direction FY of a single tooth on a cutter on one of the spindles of the machine tool in FIG. 1.
Figure 7:
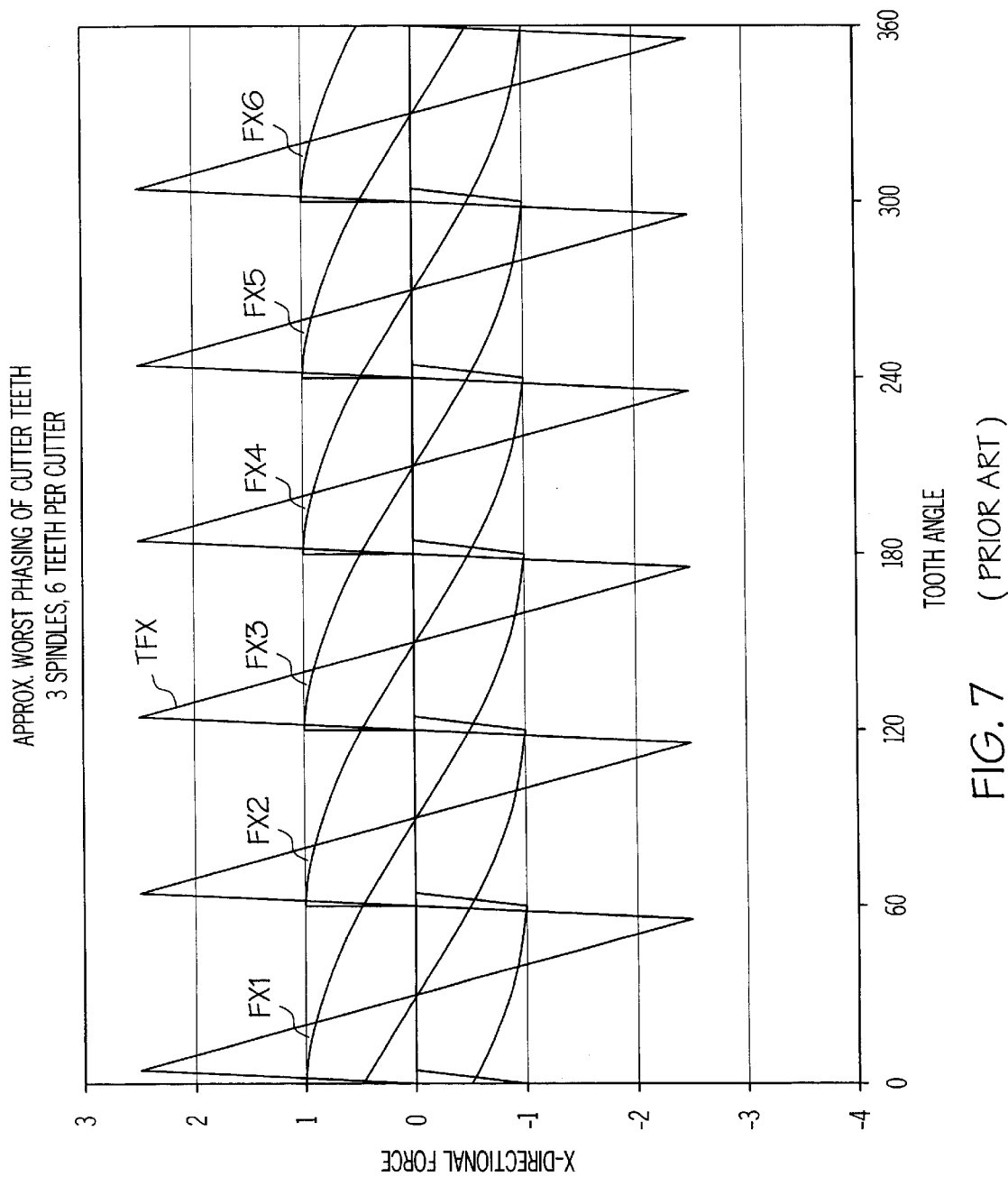
FIG. 7 is a graphical illustration of an approximate total reaction forces TFX in the X-direction with a worst case X direction phasing of the 3 spindles in FIGS. 1 and 2 cutting simultaneously as may occur in the prior art.

FIGS. 5 and 6 graphically illustrate simplified calculations of a reaction force FX in the X-direction and a reaction force in the Y-direction FY (perpendicular to the direction of feed) profiles respectively of the single linear cutting edge or single tooth 32 of the cutter 12 having 6 cutter teeth 32. FIG. 7 graphically illustrates a simplified calculation of approximate total X-direction reaction forces TFX with a worst case X direction phasing of the 3 spindles 30 cutting simultaneously. The total X-direction reaction forces TFX is a summation of first through sixth single X-direction reaction force FX1–FX6 of the six cutter teeth on the cutter 12. This condition exists when all 3 spindles 30 are perfectly aligned such that 3 cutting edges or teeth 32, one on each of the spindle 30 enters the workpiece simultaneously. The summation of the force for a fully engaged cut is indicated in a heavy line. It shows 6 predominant "saw cut edge-shaped" cycles per single revolution of the spindles. The maxima and minima of the summation are approximately 2.5 times the peak force of that expected from an individual cutting edge force profile. Worst case would be 3 times the peak force of that expected from an individual cutting edge force profile at the instant of engagement.

Figure 8:
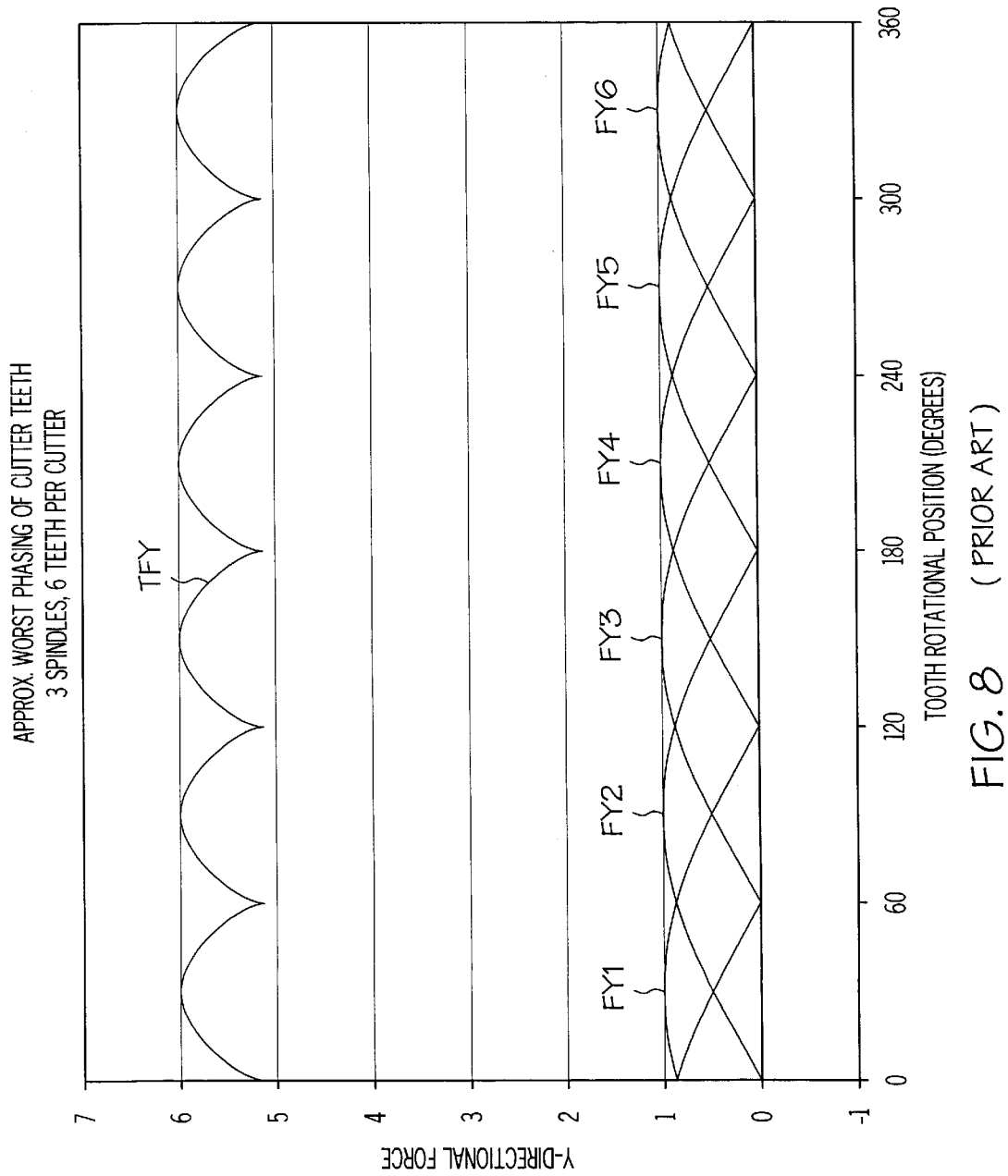
FIG. 8 is a graphical illustration of an approximate total reaction forces in the Y-direction with a worst case phasing of the 3 spindles in FIGS. 1 and 2 cutting simultaneously as may occur in the prior art.

FIG. 8 illustrates a simplified calculation of total Y-direction worst case phasing of the 3 spindles cutting simultaneously. The total Y-direction reaction forces TFY is a summation of first through sixth single Y-direction reaction force FY1–FY6 of the six cutter teeth on the cutter 12. Note that the total Y-direction force TFY never exhibits a negative (opposite direction) component and thus there is never a canceling effect for the summation. The highlighted summation shows a peak of 6 times the peak force of that expected from an individual cutting edge force profile. Note that there are 3 teeth in the cuter for each of the 3 spindles.

Figure 9:
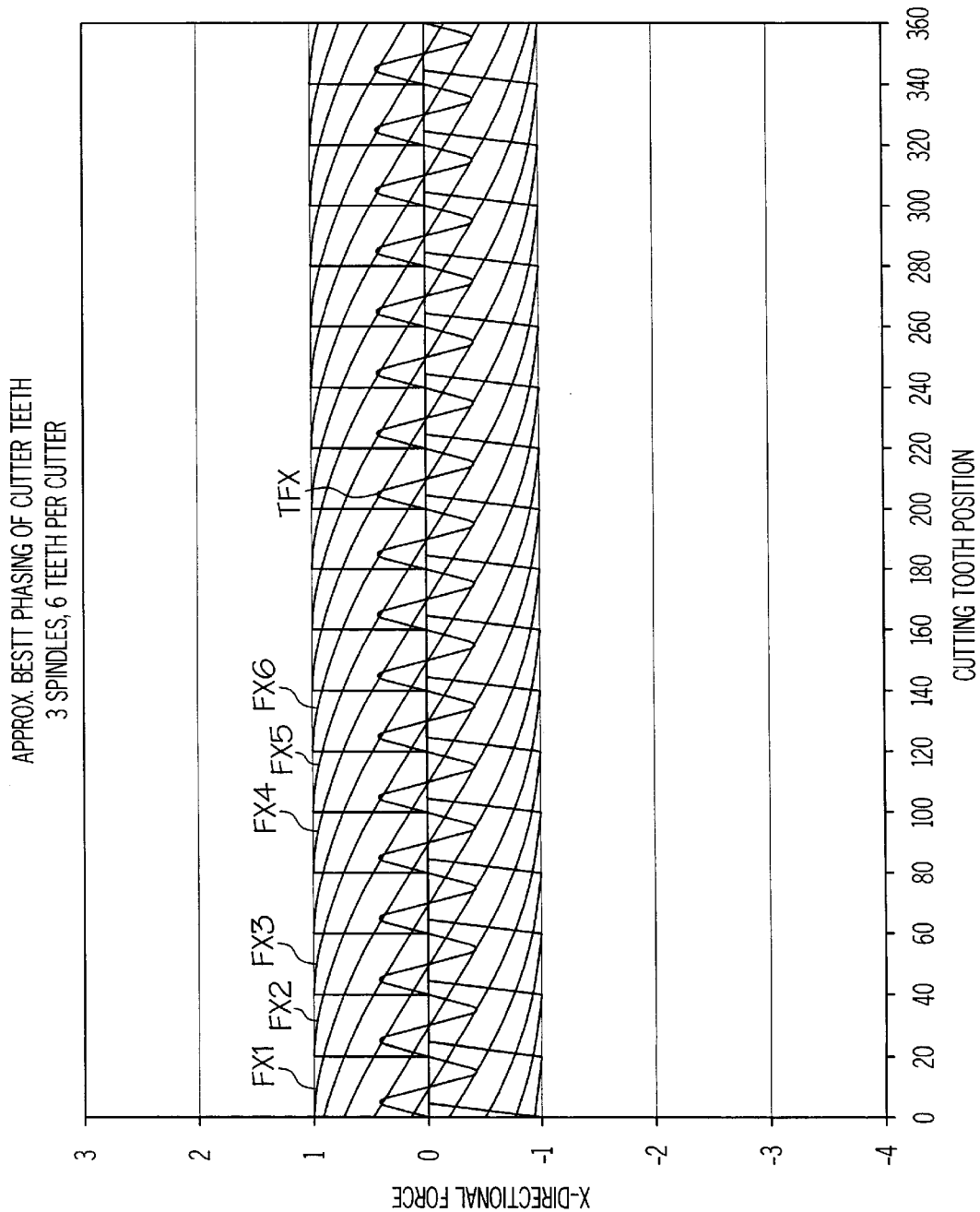
FIG. 9 is a graphical illustration of an approximate total X-direction reaction forces TFX in the X-direction for best case phasing with a 20 degree phase delay between each of teeth of the 3 different spindles.

FIG. 9 illustrates a simplified calculation of the X-direction case for the approximate "best" phasing which there is a 20 degree phase delay between each of teeth 32 of the 3 different spindles 30. In this case, the summation is reduced to ±0.5 times the peak force of that expected from an individual cutting edge force profile. Note that the predominant number of cycles in this case equals the total number of teeth which is 18.

Figure 10:
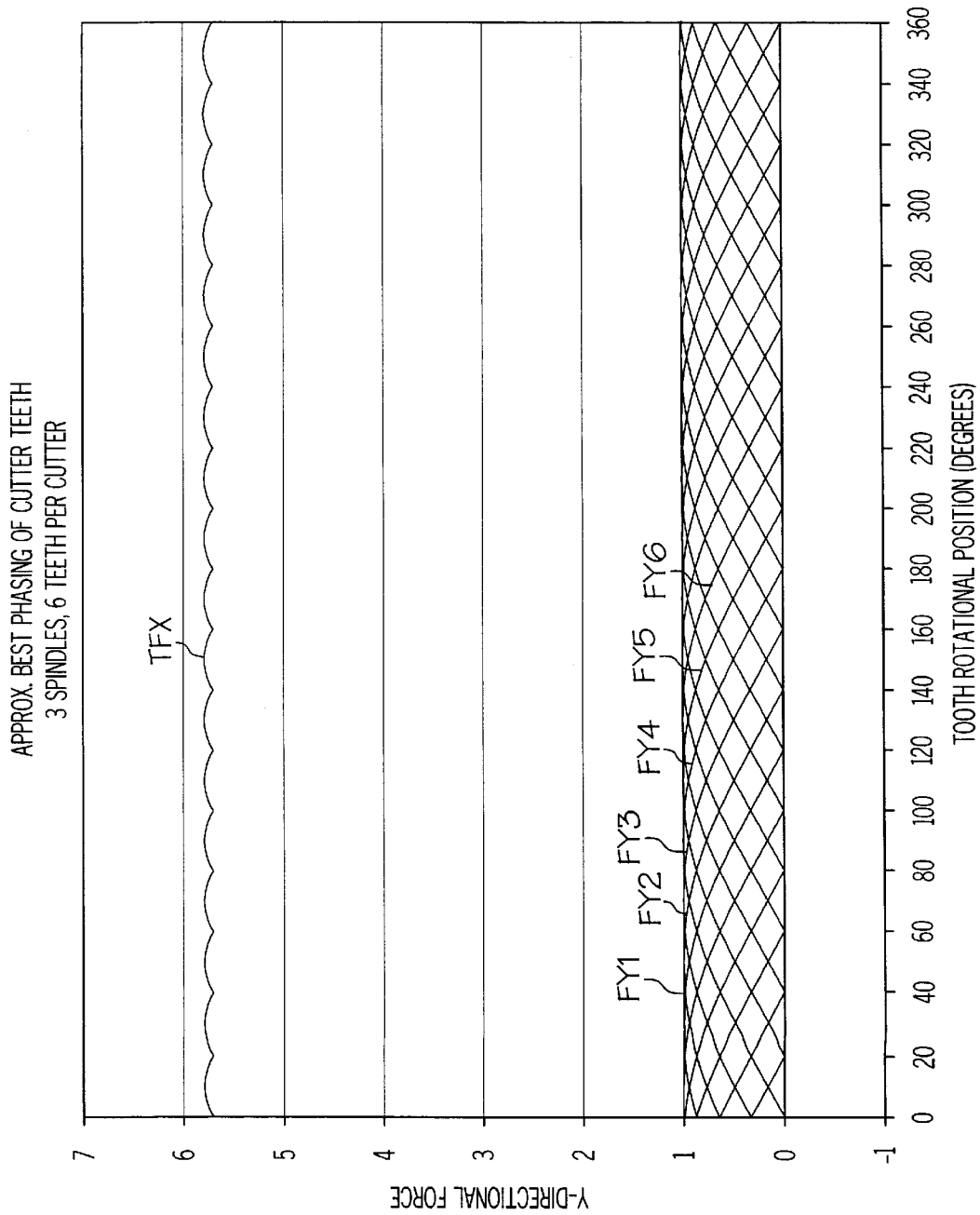
FIG. 10 is a graphical illustration of an approximate total Y-direction reaction forces TFY for in the Y-direction for best case phasing with a 20 degree phase delay between each of teeth of the 3 different spindles.

FIG. 10, similarly for the best case Y-direction phasing shows little change in the total force however, the 18 cycles have less peak to peak variation than the worse case 6 cycle variation illustrated in FIG. 8. This illustrates how the invention produces a much smoother cut, from a vibration perspective.

Referring again to FIG. 4, a more particular embodiment of the invention includes angular position detecting means 50 for detecting angular positions 40 of each of the spindles and angular speed detecting means 52 for detecting angular speed W of each of the spindles. The angular position detecting means 50 and the angular speed detecting means 52 may be angular position and speed feedback transducers that are in signal transmitting relationship with the phase control means 44. In a preferred embodiment of the invention, the phase control means is programmed to adjust speed of the spindles such that cutting edge angular positions are out of phase by an amount equal to 360 degrees divided by product of the number of the spindles 30 and the number of cutting edges or teeth 32 of each of the cutters 12.

Thus, the best phasing or spacing from tooth to tooth can be calculated from the following formula:

Optimum angle (in degrees) between teeth=(360/)/[(number of spindles)×(number of cutter teeth per spindle)].

Figure 11:
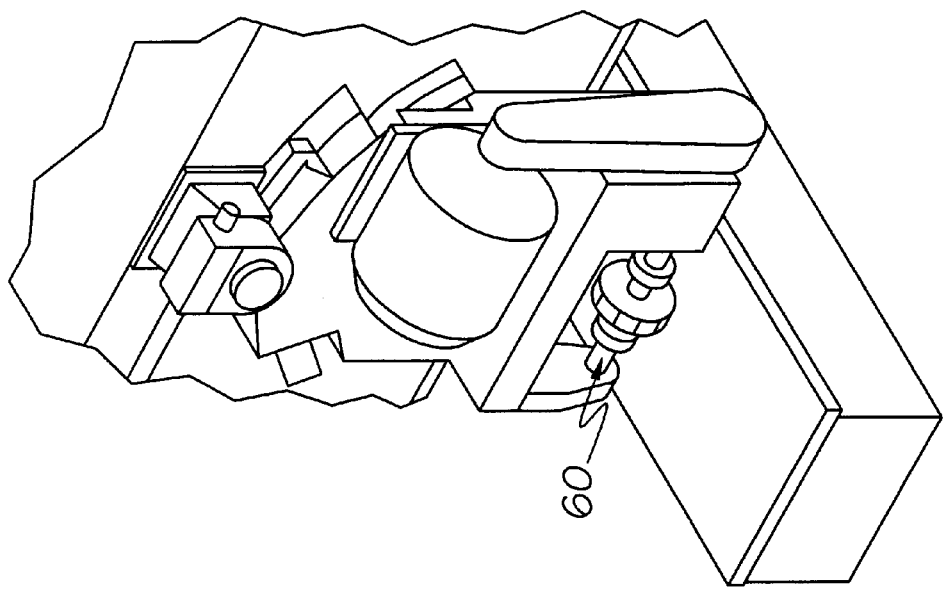
FIG. 11 is a perspective view of a horizontal 4-axis spindle.

FIGS. 1 and 2 illustrate the invention for a vertical 5-axis machine 10. The invention may be applied to many types of machine tools including but not limited to a machine having horizontal 4-axis spindles 60 as illustrated in FIG. 11.

While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A multiple-spindle machine comprising:

a support, a number of spindles rotatably mounted to and with respect to said support, each spindle being rotatable about a respective longitudinal axis, each of said spindles operably connected and in driving relationship to a respective one of a like number of cutters, each of said cutters having a number of cutting edges, said number of cutting edges of each of said cutters being two or more, each of said spindles operably connected to a respective one of a like number of individually controllable electric motors for rotatably driving each of said spindles respectively, control means for controlling a speed of each of said electric motors and an angular position of each associated spindle and cutter about said associated longitudinal axis thereof, and phase control means for adjusting said speed and said angular position of each of said spindles such that said cutting edges of each of said cutters are at different angular positions than, and are thus out of phase with, each of said cutting edges of others of said cutters during operation of the multiple-spindle machine.

2. A machine as claimed in claim 1 further comprising:

an angular position detecting means for detecting said angular positions of each of said spindles, rotational speed detecting means for detecting rotational speed of each of said spindles, and said angular position detecting means and said rotational speed detecting means are in signal transmitting relationship with said phase control means.

3. A machine as claimed in claim 1 wherein said phase control means is programmed to adjust speed of said spindles such that said cutting edge angular positions of each of said cutters are out of phase by an amount equal to 360 degrees divided by a product of said number of said spindles and said number of cutting edges of each of said cutters.

4. A machine as claimed in claim 1 further comprising:

a number of spindle carriers, each of said spindles and said motors carried on one of each of said spindle carriers, a vertically translatable slide supporting said spindle carriers, said vertically translatable slide mounted on a horizontally translatable gantry.

5. A machine as claimed in claim 4 wherein said spindles are horizontal 4-axis spindles.

6. A machine as claimed in claim 4 wherein said spindles are vertical 5-axis spindles.

7. A machine as claimed in claim 4 wherein said phase control means is programmed to adjust speed of said spindles such that said cutting edge angular positions of each of said cutters are out of phase by an amount equal to 360 degrees divided by a product of said number of said spindles and said number of cutting edges of each of said cutters.

8. A machine as claimed in claim 7 further comprising:

an angular position detecting means for detecting said angular positions of each of said spindles, rotational speed detecting means for detecting rotational speed of each of said spindles, and said angular position detecting means and said rotational speed detecting means are in signal transmitting relationship with said phase control means.

9. A method of operating a multiple-spindle machine having a support, a number of spindles rotatably mounted to the support, each spindle being rotatable about a respective longitudinal axis, each of the spindles operably connected and in driving relationship to a respective one of a like number of cutters, and each of the cutters having two or more cutting edges, said method comprising:

rotatably driving each of the spindles with a respective one of a like number of individually controllable electric motors, operably controlling a speed of each of said electric motors and an angular position of each associated spindle and cutter about said associated longitudinal axis thereof, and adjusting the speed and angular positions of each of the spindles such that the cutting edges of each of the cutters are at different angular positions than, and are thus out of phase with, each of the cutting edges of others of the cutters.

10. A method as claimed in claim 9 further comprising using angular position detecting means for detecting the angular positions of each of the spindles and using rotational speed detecting means for detecting rotational speed of each of the spindles.

11. A method as claimed in claim 10 further comprising using the phase control means to adjust speeds of the spindles such that the cutting edge angular positions of each of the cutters are out of phase by an amount equal to 360 degrees divided by a product of the number of the spindles and the number of cutting edges of each of the cutters.

* * * * *